US008094706B2

(12) United States Patent
Kim et al.

(10) Patent No.: US 8,094,706 B2
(45) Date of Patent: Jan. 10, 2012

(54) FREQUENCY-BASED, ACTIVE MONITORING OF RELIABILITY OF A DIGITAL SYSTEM

(75) Inventors: Dae Ik Kim, Fishkill, NY (US); Jonghae Kim, Fishkill, NY (US); Moon Ju Kim, Wappingers Falls, NY (US); James R. Moulic, Poughkeepsie, NY (US); Hong Hua Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 11/733,318

(22) Filed: Apr. 10, 2007

(65) Prior Publication Data

US 2008/0253437 A1 Oct. 16, 2008

(51) Int. Cl.
*H04B 3/46* (2006.01)
*H04B 17/00* (2006.01)
*H04Q 1/20* (2006.01)
(52) U.S. Cl. .......................................... 375/228; 375/64
(58) Field of Classification Search ................... 375/228, 375/224; 370/229; 331/64, 57
See application file for complete search history.

(56) References Cited

U.S. PATENT DOCUMENTS

| | | | | |
|---|---|---|---|---|
| 4,443,116 | A * | 4/1984 | Yoshida et al. | 368/202 |
| 5,175,751 | A | 12/1992 | Heaney et al. | |
| 5,534,786 | A | 7/1996 | Kaneko et al. | |
| 5,625,288 | A | 4/1997 | Snyder et al. | |
| 5,986,282 | A | 11/1999 | Seki | |
| 6,063,641 | A | 5/2000 | Seki | |
| 6,091,287 | A | 7/2000 | Salter et al. | |
| 6,233,536 | B1 | 5/2001 | Zale et al. | |
| 6,400,173 | B1 | 6/2002 | Shimizu et al. | |
| 6,557,035 | B1 | 4/2003 | McKnight | |
| 6,727,723 | B2 | 4/2004 | Shimizu et al. | |
| 6,937,965 | B1 | 8/2005 | Bilak et al. | |
| 7,450,655 | B2 * | 11/2008 | Singh | 375/267 |
| 2002/0174384 | A1 | 11/2002 | Graichen et al. | |
| 2003/0158803 | A1 | 8/2003 | Darken et al. | |

(Continued)

OTHER PUBLICATIONS

Notification of Transmittal of the International Search Report and the Written Opinion of the International Searching Authority, or the Declaration, PCT Application No. PCT/EP2008/052021, dated Oct. 8, 2008.

*Primary Examiner* — David C. Payne
*Assistant Examiner* — Brian J Stevens
(74) *Attorney, Agent, or Firm* — William E. Schiesser; Kevin P. Radigan, Esq.; Heslin Rothenberg Farley & Mesiti P.C.

(57) ABSTRACT

Method, system and article of manufacture are provided for continually monitoring reliability, or aging, of a digital system and for issuing a warning signal if digital system operation degrades to or past a specified threshold. The technique includes periodically determining a maximum frequency of operation of the digital system, and generating a warning signal indicative of a reliability degradation of the digital system if at least one of: (i) a measured or estimated maximum frequency of operation of the digital system is below a warning threshold frequency of operation of the digital system, wherein the warning threshold frequency is greater than or equal to a manufacturer specified minimum frequency of operation for the digital system; or (ii) a rate of change in the difference between measured maximum frequencies of operation of the digital system exceeds an acceptable rate of change threshold for the digital system.

18 Claims, 14 Drawing Sheets

U.S. PATENT DOCUMENTS

| | | |
|---|---|---|
| 2003/0233624 A1* | 12/2003 | Reddy et al. .................. 716/4 |
| 2004/0059694 A1 | 3/2004 | Darken et al. |
| 2005/0134394 A1 | 6/2005 | Liu |
| 2005/0257078 A1 | 11/2005 | Bose et al. |
| 2006/0240990 A1 | 10/2006 | Reich, Jr. |
| 2007/0074011 A1* | 3/2007 | Borkar et al. ................ 712/227 |
| 2007/0157056 A1* | 7/2007 | Haehn et al. .................. 714/724 |
| 2007/0204191 A1* | 8/2007 | Tailliet et al. ................ 714/724 |

* cited by examiner

FREQUENCY-BASED, ACTIVE MONITORING OF RELIABILITY OF A DIGITAL SYSTEM

TECHNICAL FIELD

The present invention relates in general to the field of failure prediction and, more specifically, to a reliability measurement and warning method, system and computer program product for a digital system.

BACKGROUND OF THE INVENTION

Failure rates of individual components making up a digital system such as an integrated circuit (or larger system) are fundamentally related to various parameters, including operating temperatures, as well as scaling of the digital system and interconnect geometries. Although burn-in testing of digital systems attempts to predict a lifecycle for a given type of digital system, it does not provide aging information for each specific digital system of the type being manufactured. Currently, a customer or user may uncover a problem with a digital system only after a catastrophic system failure. While catastrophic failure of a digital system is readily recognizable, a "soft" failure (where there may be significant degradation in digital system performance or reliability) may go unnoticed, which implies that such aging of the digital system may cause undetected errors in computation and data, from which it is difficult to recover.

SUMMARY OF THE INVENTION

Presented herein is an approach for actively monitoring or measuring aging, and hence reliability, of a specific digital system and for issuing a warning signal if, for example, degradation of operation of the system exceeds a specified threshold.

In one aspect, a method of monitoring the reliability of a digital system is provided. This method includes: periodically determining a maximum frequency of operation of the digital system; and generating a warning signal indicative of reliability degradation of the digital system if at least one of: (i) a measured or estimated maximum frequency of operation of the digital system is below a warning threshold frequency of operation for the digital system, wherein the warning threshold frequency is greater than equal to a manufacturer specified minimum frequency of operation for the digital system; or (ii) a rate of change in a difference between measured maximum frequencies of operation of the digital system exceeds an acceptable rate of change threshold for the digital system.

In another aspect, a system of monitoring reliability of digital system is provided. The system includes control logic adapted to periodically determine a maximum frequency of operation of the digital system, and to generate a warning signal indicative of reliability degradation of the digital system if at least one of: (i) a measured or estimated maximum frequency of operation of the digital system is below a warning threshold frequency of operation for the digital system, wherein the warning threshold frequency is greater than or equal to a manufacturer specified minimum frequency of operation for the digital system; or (ii) a rate of change in a difference between measured maximum frequencies of operation of the digital system exceeds an acceptable rate of change threshold for the digital system.

In a further aspect, an article of manufacture is provided which includes at least one computer-usable medium having computer-readable program code logic to facilitate monitoring of reliability of a digital system. The computer-readable program code logic when executing performing the following: periodically determining a maximum frequency of operation of the digital system; and generating a warning signal indicative of reliability degradation of the digital system if at least one of: (i) a measured or estimated maximum frequency of operation of the digital system is below a warning threshold frequency of operation for the digital system, wherein the warning threshold frequency is greater than or equal to a manufacturer specified minimum frequency of operation for the digital system; or (ii) a rate of change in a difference between measured maximum frequencies of operation of the digital system exceeds an acceptable rate of change threshold for the digital system.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

As noted, presented herein are a method, system and program product for actively monitoring or measuring aging, and hence reliability, of a specific digital system, and for issuing a warning signal if, for example, degradation of operation of the system exceeds a prespecified threshold. The "digital system" refers to any digital system or circuit, and includes, for example, a processor, as well as simple or complex non-processor based digital logic, memory, etc. As one specific example, the digital system is a microprocessor, and the specified threshold is a predefined acceptable level for the maximum frequency of operation of the digital system.

More particularly, presented a technique for periodically determining a maximum frequency of operation of a digital system, and generating a warning signal indicative of reliability degradation of the digital system if at least one of: (i) a measured or estimated maximum frequency of operation of the digital system is below a warning threshold frequency of operation for the digital system, wherein the warning threshold frequency is greater than or equal to a manufacturer specified minimum frequency of operation for the digital system; or (ii) a rate of change in a difference between measured maximum frequencies of operation of the digital system exceeds an acceptable rate of change threshold for the digital system. These and other aspects of the present invention are described below with reference to FIGS. 1-14.

Figure 1:
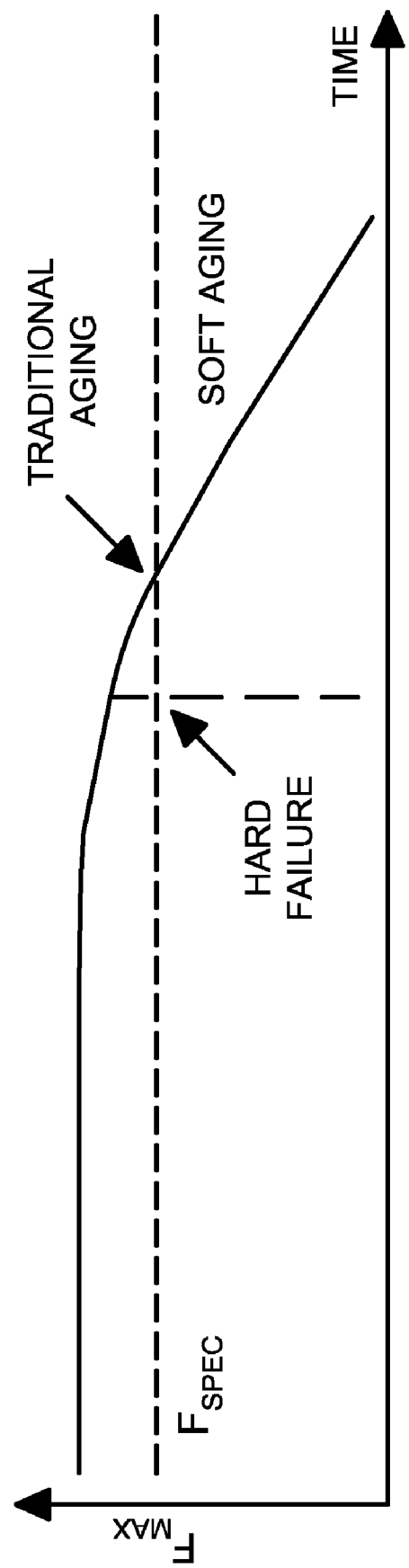
FIG. 1 is a graph of a typical digital system life cycle, illustrating hard failure and soft aging, both of which can be identified in accordance with an aspect of the present invention.

FIG. 1 depicts a typical digital system lifecycle model. This diagram illustrates that the digital system has a higher maximum frequency of operation ($F_{MAX}$) than a specified (i.e., required) maximum frequency of operation for the digital system ($F_{SPEC}$) when manufactured and beginning its lifecycle. As the digital system ages, several factors may degrade system performance, and hence decrease maximum operating frequency as a result. Factors which degrade digital system performance depend upon the particular system at issue and the environment within which the system is used. For example, if the digital system comprises a processor, aging can be caused by a variety of factors including hot election, electromigration and thermal expansion of the digital system.

Two failure modes are illustrated in FIG. 1. First a hard failure, illustrated by the dashed lines, is representative of an abrupt failure of the digital system (e.g., resulting from aging of the digital system). Soft aging is also shown wherein operation of the digital system gradually decreases to a level at or below the manufacturer specified maximum frequency of operation ($F_{SPEC}$). Due to the gradual nature of this aging, the soft aging failure may go unnoticed, which implies that such aging may cause undetected errors in computation and data. Once the maximum frequency of operation of the digital system ($F_{MAX}$) is known to fall below the manufacturer specified minimum frequency of operation of the digital system ($F_{SPEC}$) (meaning that the digital system fails to operate at the required conditions (e.g., due to a hard failure or soft failure)), then the system must be replaced or repaired. Although a hard failure is readily recognizable, an accumulated aging effect with the system operating at or near the manufacturer specified maximum frequency of operation ($F_{SPEC}$) might result in a single bit error in a block of data, and it is hard to detect occurrence of such an error employing a test instruction vector. This traditionally makes it difficult to distinguish the boundary between good and bad data results in an aging digital system.

Figure 2:
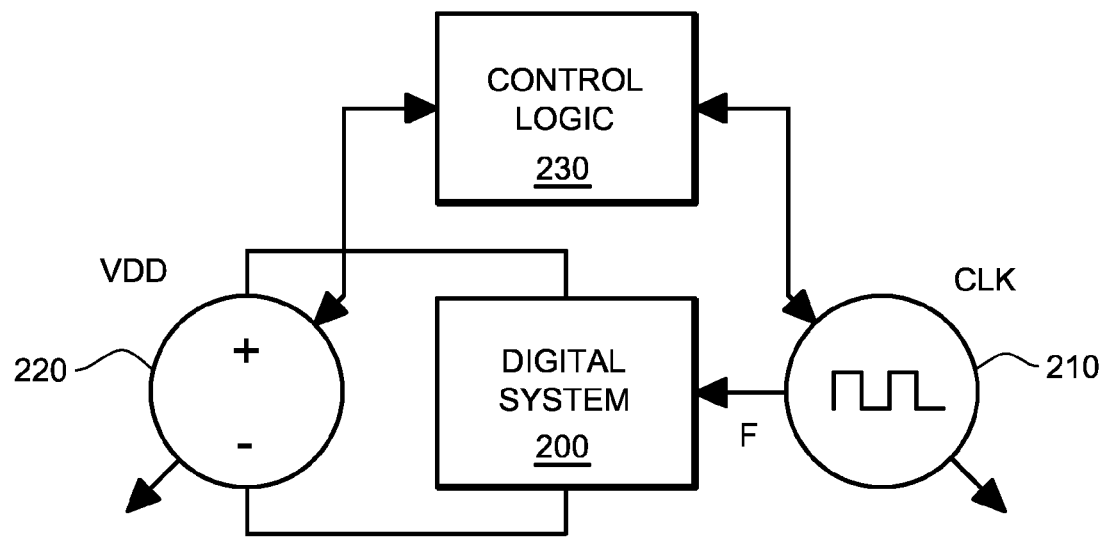
FIG. 2 depicts one embodiment of a digital system and control logic implementing reliability monitoring and warning signal generation, in accordance with an aspect of the present invention.
Figure 2A:
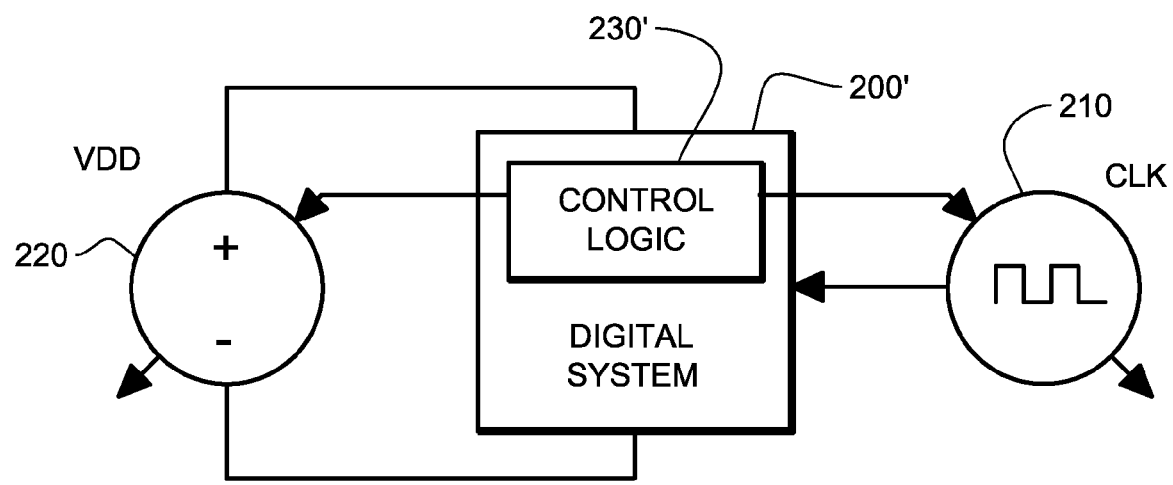
FIG. 2A is an alternate embodiment of a digital system and control logic implementing reliability monitoring and signal warning signal generation, in accordance with an aspect of the present invention.

FIGS. 2 & 2A depict embodiments of a digital system and control logic implementing reliability monitoring and warning signal generation, in accordance with an aspect of the present invention. In FIG. 2, a digital system 200 is shown to be driven by an (optionally) adjustable supply voltage 220 and an adjustable clock rate 210. (Conventionally, a fixed power supply voltage and fixed clock frequency are provided to a digital system for operation.) Control logic 230 senses and controls the adjustable supply voltage and clock rate in order to periodically measure the digital system's maximum operating frequency. As illustrated in the digital system lifecycle model of FIG. 1, a digital system qualified for a manufacturer specified maximum frequency of operation ($F_{SPEC}$) actually has a maximum operating frequency ($F_{MAX}$) which is higher than $F_{SPEC}$ when manufactured. Degradation of $F_{MAX}$ is an indication of processor soft aging. Thus, the system's age and lifetime can be measured by, for example, sweeping the supply voltage (VDD) and clock frequency ($F_{CLK}$), sending worst-case test instructions, and finding a maximum successful frequency at a given voltage (or over several voltages). These measurements can be saved to facilitate the control logic performing trend analysis on the maximum frequency of operation of the digital system for proactively issuing a warning signal prior to failure of the digital system. The collected data can also be used to estimate a digital systems' status or age, and the rate of aging.

In FIG. 2A, the digital system 200' is assumed to comprise a processor and to be capable of incorporating therein control logic 230' for reliability monitoring and signal warning generation of the digital system. An adjustable clock frequency 210 and, in one embodiment, an adjustable supply voltage VDD 220 are again provided, which are sensed and controlled by control logic 230' during reliability monitoring, as described herein.

Figure 3:
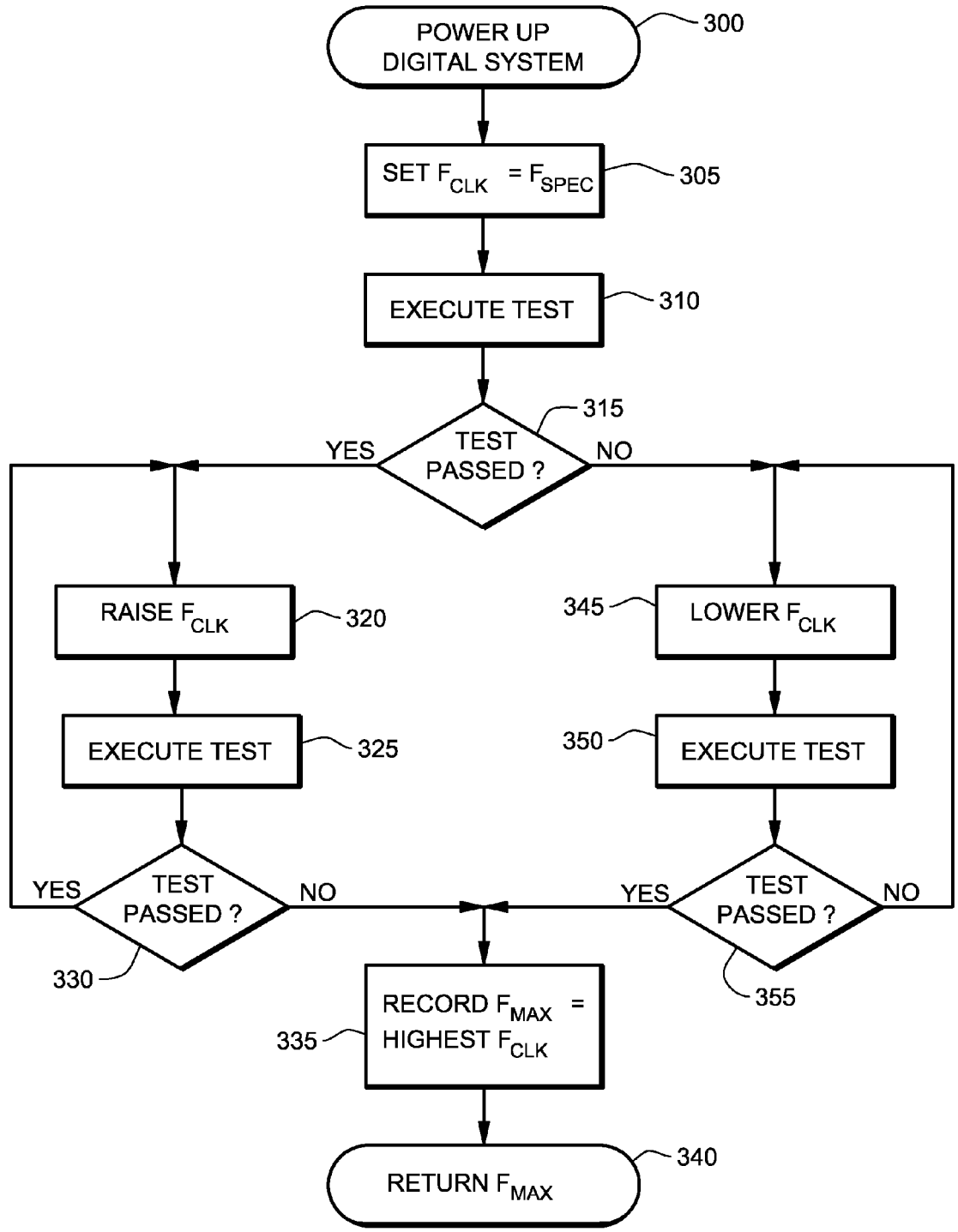
FIG. 3 is a flowchart of one embodiment of logic for periodically determining a maximum frequency of operation of a digital system, in accordance with an aspect of the present invention.

FIG. 3 depicts one embodiment of a testing protocol of control logic 230/230' for periodically determining a maximum frequency of operation of a digital system, in accordance with an aspect of the present invention. Upon power-up of the digital system 300, the adjustable clock frequency ($F_{CLK}$) is set to the manufacturer specified maximum frequency of operation ($F_{SPEC}$) for the digital system 305. A test instruction vector is sent to the digital system and results are analyzed 310. Logic then determines whether the test passed 315. If so, then the clock frequency ($F_{CLK}$) is raised 320, and a test instruction vector is again sent to the digital system and analyzed 325 to determine whether the test passed at the raised clock frequency 330. This process continues until the results from the test instruction vector no longer pass, after which the maximum measured frequency of operation of the digital system ($F_{MAX}$) is recorded as the highest clock frequency ($F_{CLK}$) with passing results 335. This measured maximum frequency of operation of the digital system ($F_{MAX}$) is then returned 340, for example, for saving in a trend database (or memory) 445 (see FIG. 4).

Assuming that the executed test did not pass with the clock frequency set to the manufacturer specified maximum frequency of operation of the digital system ($F_{SPEC}$), then the clock frequency is lowered 345, and the test is re-executed to determine if the digital system passes 355. This process continues until the clock frequency is low enough that the digital system passes the test, and the maximum frequency of operation of the digital system ($F_{MAX}$) is again recorded as the highest passing clock frequency ($F_{CLK}$) 335 and returned as the $F_{MAX}$ 340 for the digital system.

Note that in the $F_{MAX}$ search protocol of FIG. 3, the gradient by which $F_{CLK}$ is raised when the test passes 320 may be the same or different than the gradient by which the clock frequency ($F_{CLK}$) is lowered when failing the test 345. The gradient(s) selected may depend upon the age of the digital system and the accuracy desired. As explained further herein, this accuracy can be noted and changed as the digital system ages.

Figure 4:
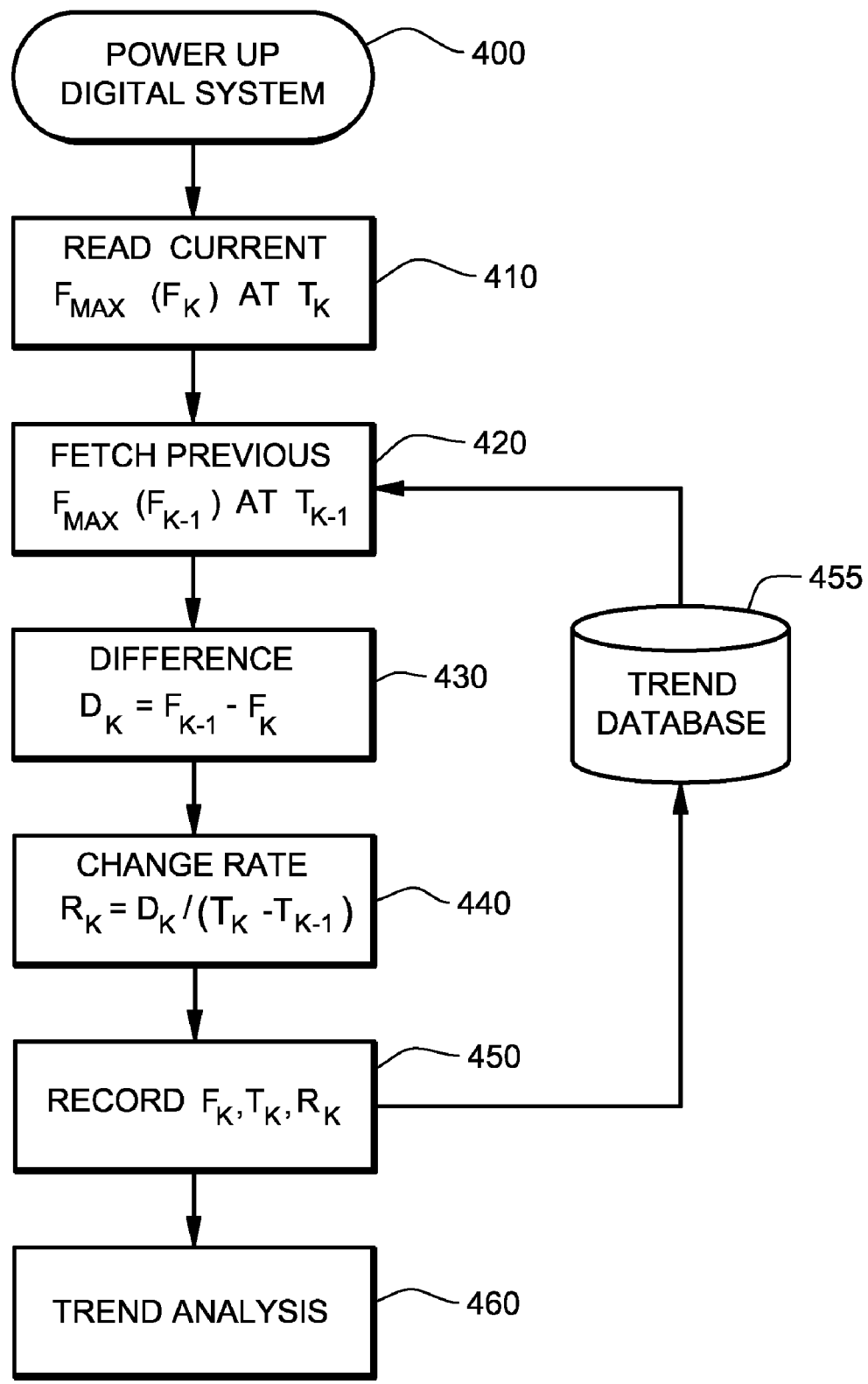
FIG. 4 is a flowchart of one embodiment of logic for tracking maximum frequency of operation of a digital system, in accordance with an aspect of the present invention.
Figure 5:
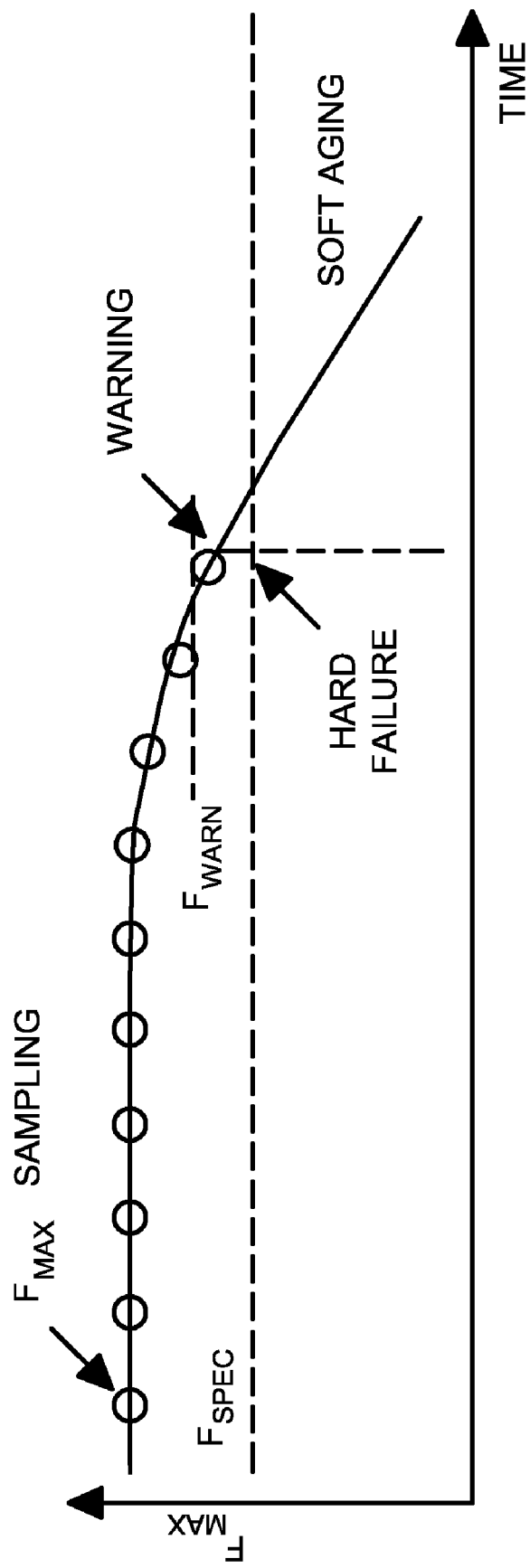
FIG. 5 graphically depicts periodically determining the maximum frequency of operation of a digital system, and signaling a warning when the maximum frequency of operation falls below a predefined warning threshold frequency of operation, in accordance with an aspect of the present invention.

FIG. 4 depicts one embodiment of logic for tracking maximum frequency of operation of a digital system, in accordance with an aspect of the present invention. Upon power-up of the digital system 400, the current maximum frequency of operation ($F_{MAX}$) is read at a time $T_K$ 410. In one embodiment, reading of the current maximum frequency of operation is synonymous with measuring the current maximum frequency of operation using the protocol described above in connection with FIG. 3. The logic also fetches the previous maximum frequency of operation of the digital system ($F_{MAX}(F_{K-1})$) at time $T_{K-1}$ 420. This previous maximum frequency of operation can be retrieved from trend database 455, which is accessible by the control logic. The difference ($D_K$) between the previous maximum frequency of operation and the current maximum frequency of operation is determined, and the rate of change ($R_K$) in the difference is calculated 440. The measured maximum frequency of operation of the digital system ($F_K$), at time $T_K$ is then recorded in the trend database, along with the rate of change ($R_K$) in the difference ($D_K$) between measured maximum frequencies of operation of the digital system 450. After this, trend analysis 460 may be performed, either commensurate with each periodic determination of the maximum frequency of operation of the digital system, or at some other specified interval.

In a simplest method of trend analysis, the currently measured maximum frequency of operation of the digital system ($F_{MAX}$) is compared against a predefined warning threshold frequency of operation ($F_{WARN}$) for the digital system. The predefined warning threshold frequency ($F_{WARN}$) may be greater than or equal to the manufacturer specified maximum frequency of operation for the digital system ($F_{SPEC}$). In the lifecycle illustration of FIG. 5, the warning threshold frequency of operation is above the manufacturer specified minimum frequency of operation, and when the maximum frequency of operation of the digital system drops to or below the warning threshold frequency of operation, a warning signal is generated by the control logic and sent, for example, to an operating system of the digital system. In this embodiment, the warning signal indicates that the maximum frequency of operation of the digital system may be slower than the manufacturer specified maximum frequency of operation ($F_{SPEC}$) in the near future (e.g., due to continued soft aging of the system, or resulting from a hard failure due to aging of the system). At this point, the warning signal may also be provided to a user of the digital system so than an appropriate procedure, such as shutdown, can be taken. As explained further below, when the maximum frequency of operation of the digital system is at or below the warning threshold frequency of operation of the digital system, the sampling rate for determining the maximum frequency of operation for the digital system may also be increased to more accurately monitor the digital system's status.

FIGS. 6-10 depict various further embodiments for performing trend analysis on the maximum frequency of operation of the digital system, in accordance with aspects of the present invention.

Figure 6:
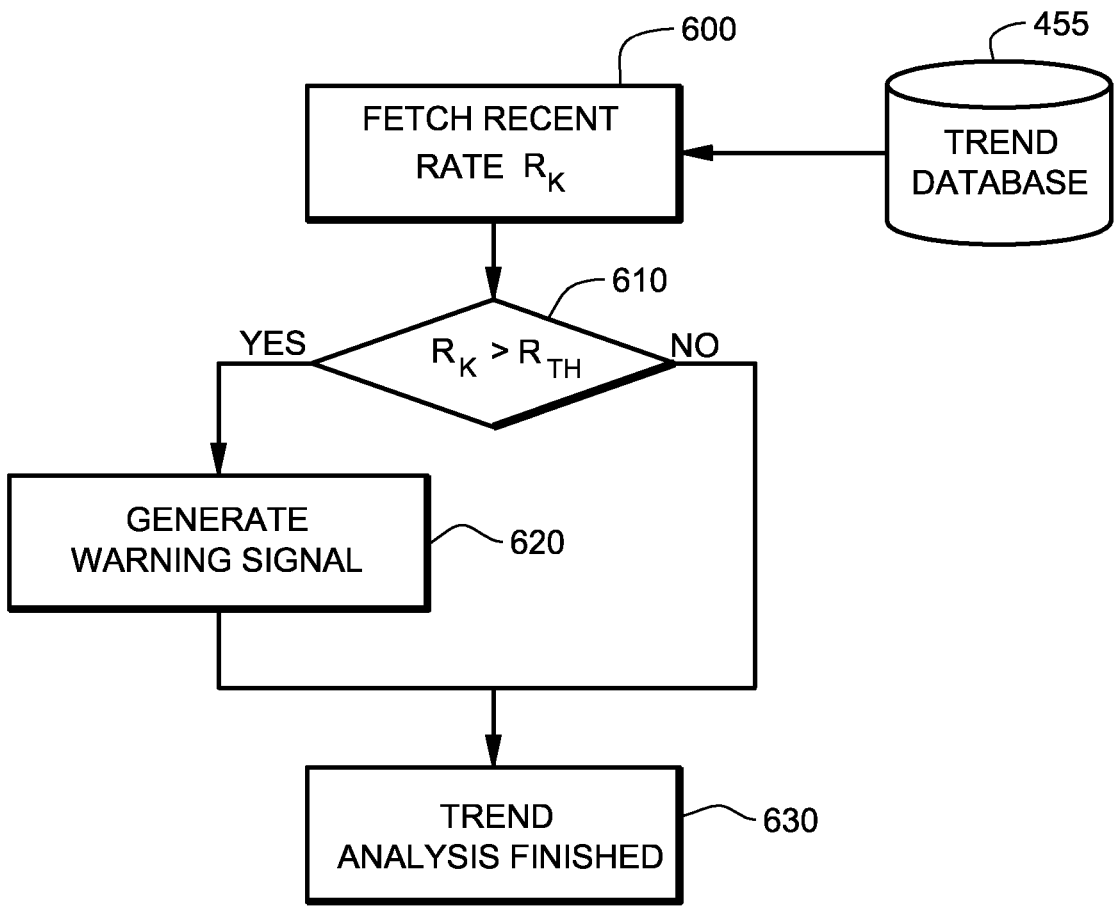
FIG. 6 is a flowchart of one embodiment of logic for trend analysis of a digital system and for generating a warning signal based thereon, in accordance with an aspect of the present invention.

FIG. 6 presents a trend analysis approach wherein instead of employing the maximum frequency of operation of the digital system in comparison with a prespecified threshold to generate the warning signal, the rate of change ($R_K$) in the difference between measured maximum frequencies of operation of the digital system is employed, in accordance with an aspect of the present invention. Specifically, a most recent rate of change ($R_K$) in the difference between measured maximum frequencies of operation of the digital system is retrieved 600 from the trend database 455. This recent rate of change ($R_K$) is then compared against a specified threshold rate of change ($R_{TH}$) in the difference between measured maximum frequencies of operation 610. By way of example, the specified threshold rate of change ($R_{TH}$) may be chosen based on historical aging information for the type of digital system being monitored. If the recently determined rate of change ($R_K$) is greater than the specified threshold rate of change ($R_{TH}$), then a warning signal is generated 620, thereby completing trend analysis 630. However, if the rate of change in the difference between measured maximum frequencies of operation of the digital system is below the specified rate of change threshold, then no warning signal is generated and trend analysis is complete, allowing the digital system to return to normal operation.

Figure 7:
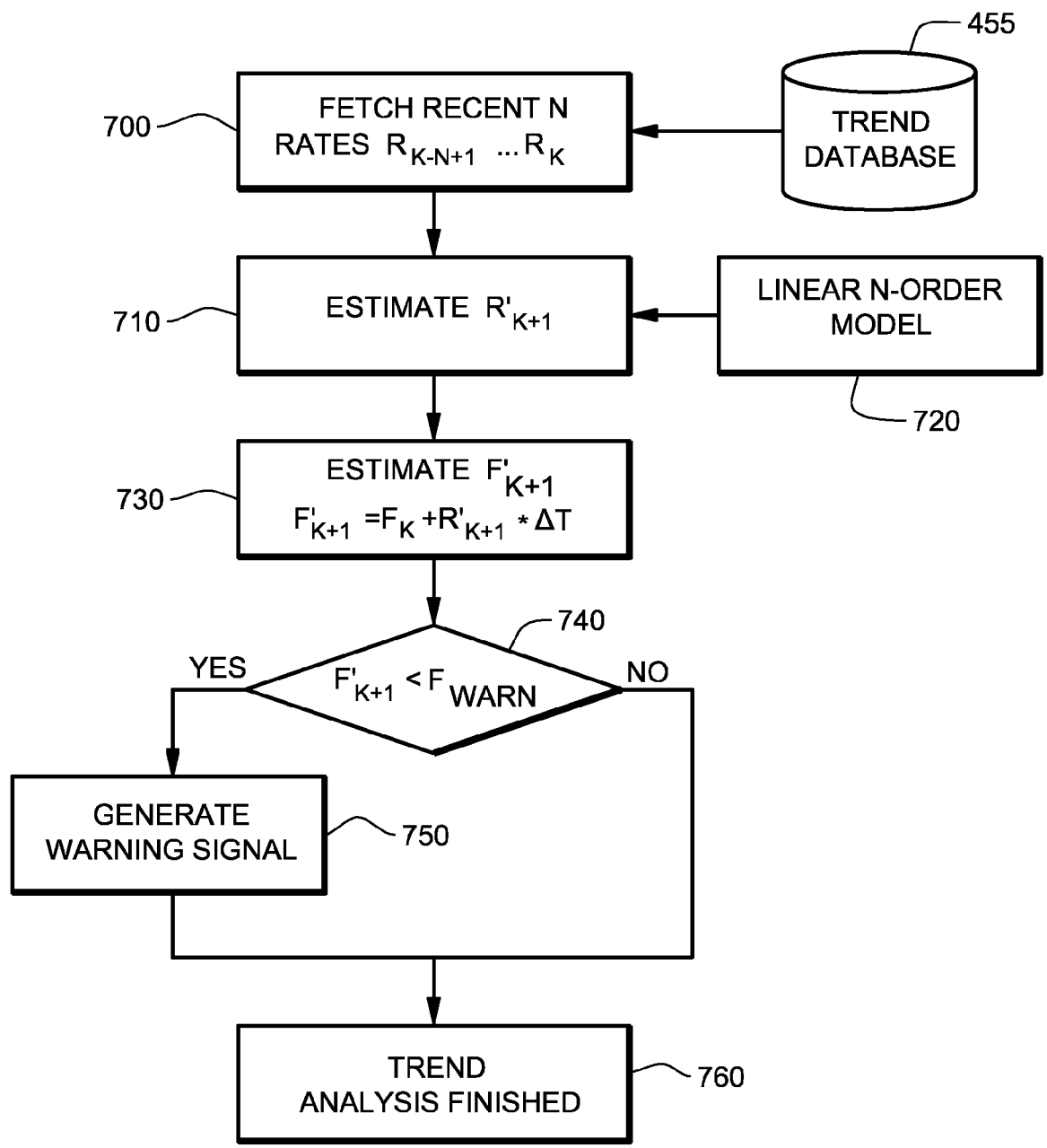
FIG. 7 is a flowchart of an alternate embodiment of logic for performing trend analysis and for generating a warning signal, in accordance with an aspect of the present invention.

FIG. 7 depicts an alternate trend analysis embodiment wherein N most recent rates of change in the difference between measured maximum frequencies of operation are fetched 700 from the trend database 455. From these values, a next rate of change ($R'_{K+1}$) in the difference between measured maximum frequencies of operation is estimated 710. This estimated next rate of change ($R'_{K+1}$) in the difference between measured maximum frequencies of operation can be determined employing conventional linear model estimation, such as a linear N-order model, wherein a linear prediction is made from the previous N rate of change determinations. From this estimated rate of change, the next maximum frequency of operation of the digital system ($F'_{K+1}$) is estimated 730, after which the logic determines whether the estimated maximum frequency of operation of the digital system ($F'_{K+1}$) is less than the predefined warning threshold frequency ($F_{WARN}$) 740. If so, then a warning signal is generated 750, which completes trend analysis 760. Assuming that the estimated next frequency of operation of the digital system ($F'_{K+1}$) is greater than the predefined warning threshold frequency ($F_{WARN}$), then no warning signal is generated, and trend analysis is finished 760.

Figure 8:
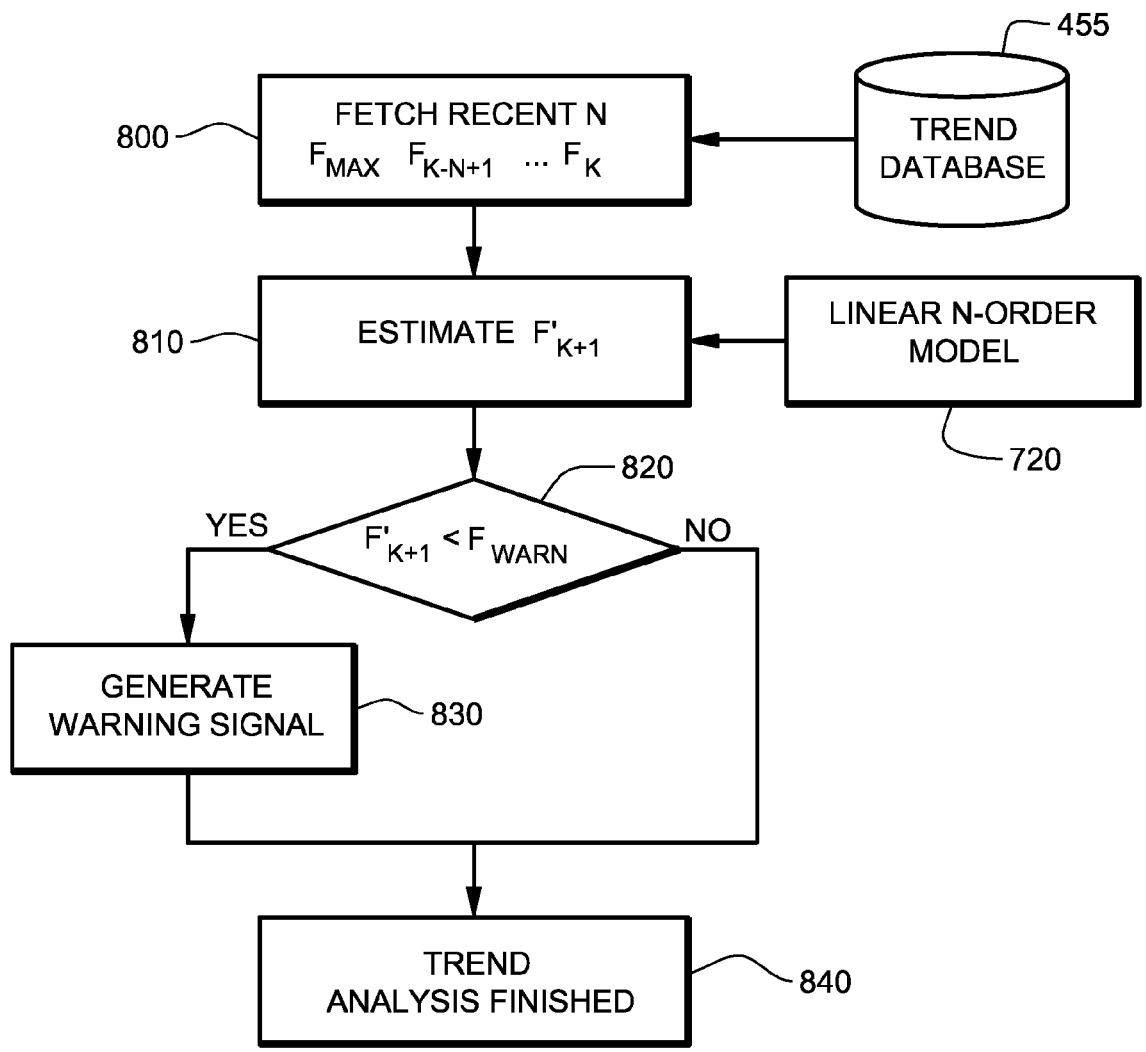
FIG. 8 is a flowchart of an alternate embodiment of logic for trend analysis of a digital system and for generating a warning system based thereon, in accordance with an aspect of the present invention.

The logic of FIG. 8 is similar to the logic of FIG. 7, with the exception that the next maximum frequency of operation of the digital system ($F'_{K+1}$) is estimated directly from N prior saved measured maximum frequencies of operation of the digital system. Specifically, the most recent N measured maximum frequencies of operation of the digital system are fetched 800 from the trend database 455, and from these values, the next maximum frequency of operation of the digital system ($F'_{K+1}$) is estimated 810 using, for example, linear N-model analysis 720. If the estimated next maximum frequency of operation of the digital system ($F'_{K+1}$) is less than the predefined warning threshold frequency ($F_{WARN}$) 820, then a warning signal is generated 830, thereby completing trend analysis 840. No warning signal is generated if the estimated next maximum frequency of operation of the digital system is above the warning threshold frequency.

Figure 9:
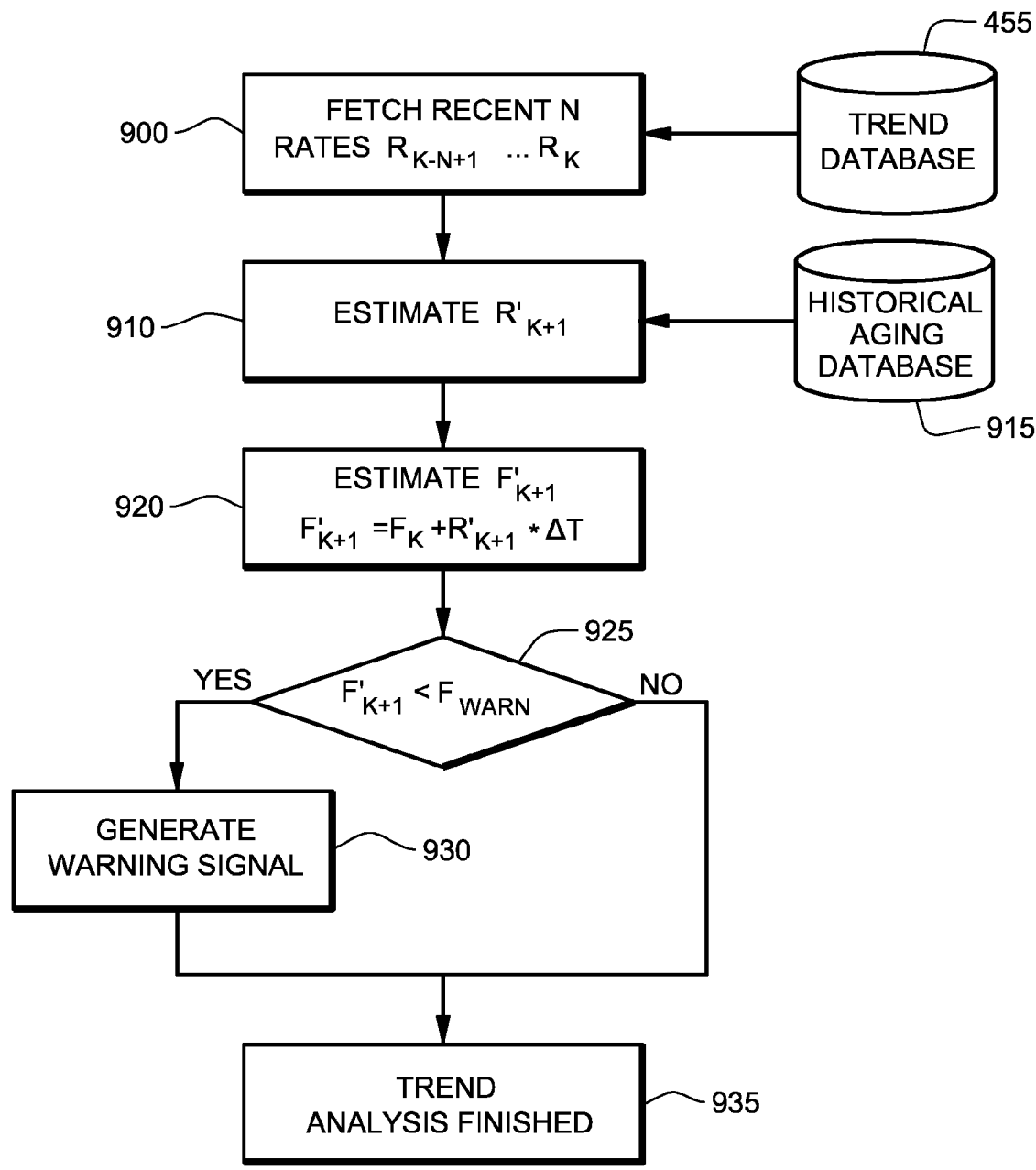
FIG. 9 is a flowchart of a further embodiment of logic for trend analysis of a digital system and for generating a warning signal based thereon, in accordance with an aspect of the present invention.

FIG. 9 depicts an alternate approach wherein historical aging information saved in a historical aging database (or memory) 915 is employed in estimating a next rate of change in the difference between measured maximum frequencies of operation of the digital system in place of a linear N-order model, such as employed in the processing of FIG. 7. The historical aging information may comprise a database of aging information gathered through conventional burn-in testing on the type of digital system being monitored. Alternatively, the historical aging information could be derived from measuring aging of other digital systems of the particular type as the current digital system being monitored. Depending upon the digital system, this historical aging information may provide a more accurate estimate of a next maximum frequency of operation and/or a next rate of change in the difference between measured maximum frequencies of operation than a linear progression model.

In the protocol of FIG. 9, the most recent N determined rates of change in the difference between measured maximum frequencies of operation of the digital system are retrieved 900 from the trend database 455 and employed with the historical aging information or nominal aging model (from database 915) to estimate a next rate of change ($R'_{K+1}$) in the difference between measured maximum frequencies of operation of the digital system 910. From this estimated next rate of change, a next maximum frequency of operation of the digital system ($F'_{K+1}$) is estimated 920, for example, by adding to the prior maximum frequency of operation of the digital system the estimated rate of change in the difference between the measured maximum frequencies of operation multiplied by the difference in time between measurements. The estimated next maximum frequency of operation ($F'_{K+1}$) is then compared against the predefined warning threshold frequency ($F_{WARN}$) 925, and a warning signal is generated if the estimated next maximum frequency of operation is below the warning threshold 930. Otherwise, no warning signal is generated and trend analysis is complete 935.

Figure 10:
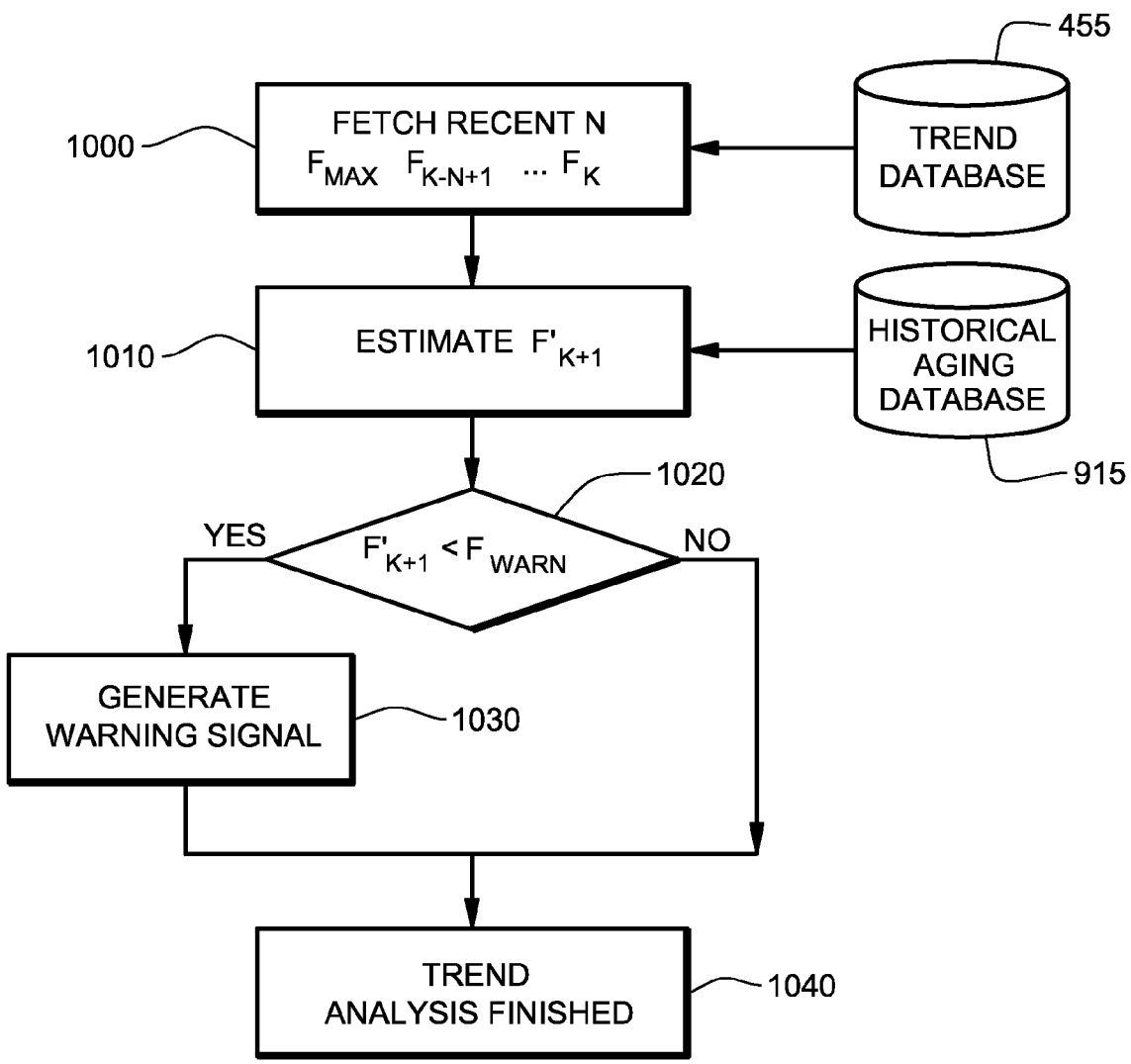
FIG. 10 is a flowchart of an alternate embodiment of logic for trend analysis of a digital system and for generating a warning signal based thereon, in accordance with an aspect of the present invention.

FIG. 10 depicts an alternate analysis approach wherein N recently measured maximum frequencies of operation are retrieved 1000 from the trend database 455 and employed to directly estimate a next maximum frequency of operation of the digital system ($F'_{K+1}$) 1010 employing historical aging information from the historical aging database 915. The estimated next maximum frequency of operation of the digital system is then compared against the predefined warning threshold frequency 1020, and if less, a warning signal is generated 1030. Otherwise, no warning signal is generated and trend analysis is complete 1040, that is, until a next analysis interval.

Figure 11:
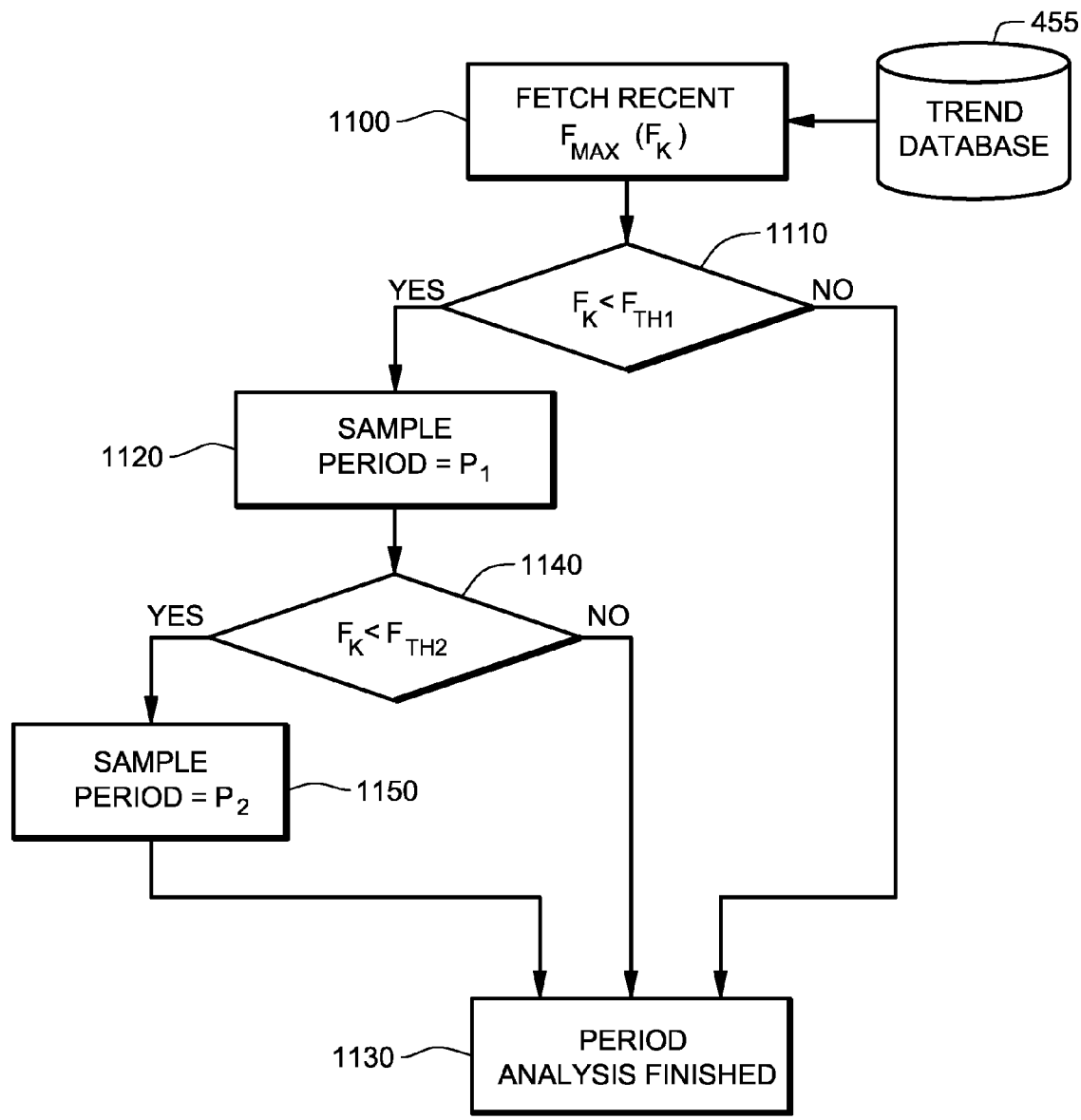
FIG. 11 is a flowchart of one embodiment of logic implementing a variable sampling period for determining maximum frequency of operation of a digital system, in accordance with an aspect of the present invention.
Figure 12:
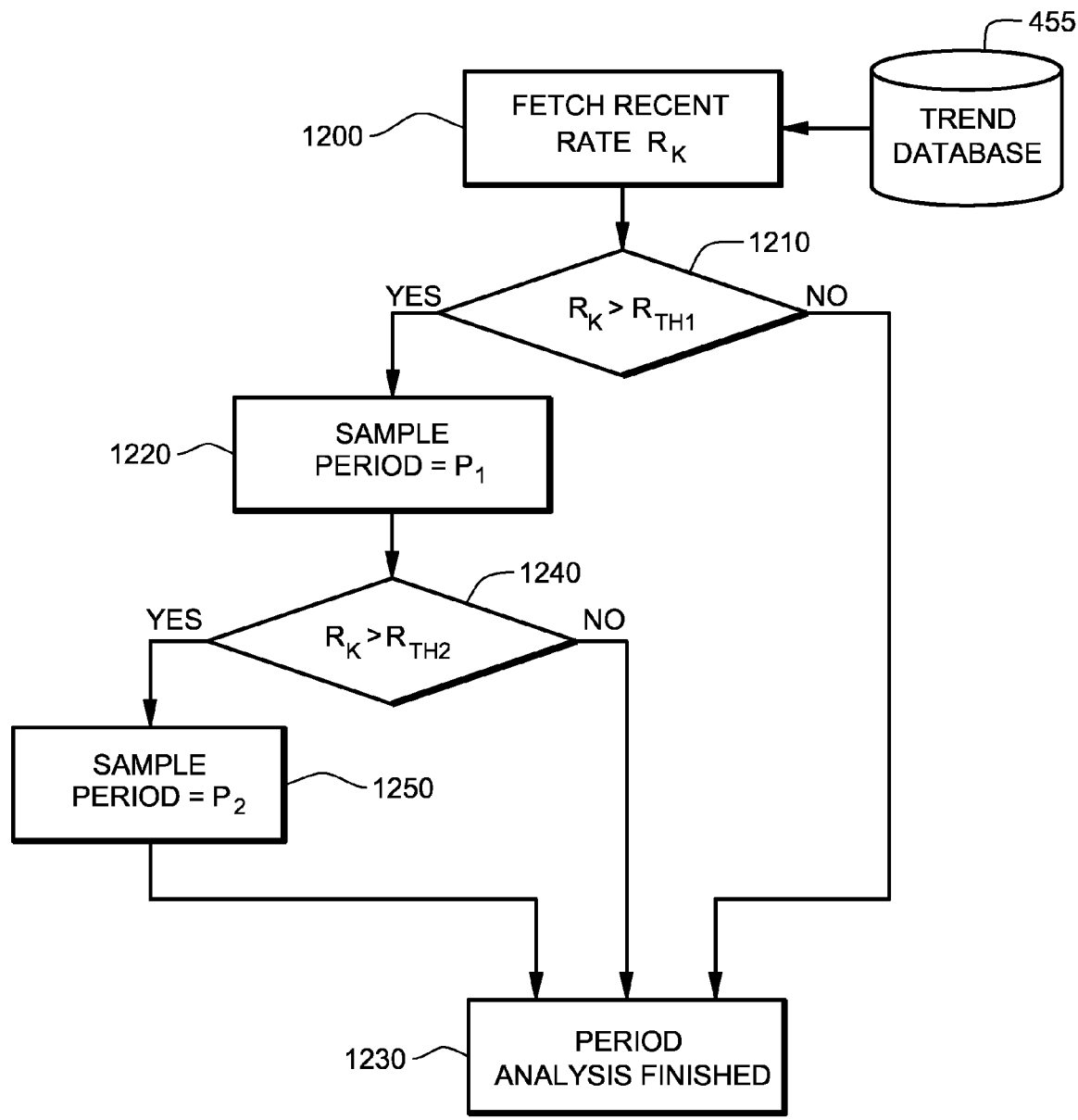
FIG. 12 is a flowchart of an alternate embodiment of logic implementing a variable sampling period for determining a maximum frequency of operation of a digital system, in accordance with an aspect of the present invention.
Figure 13:
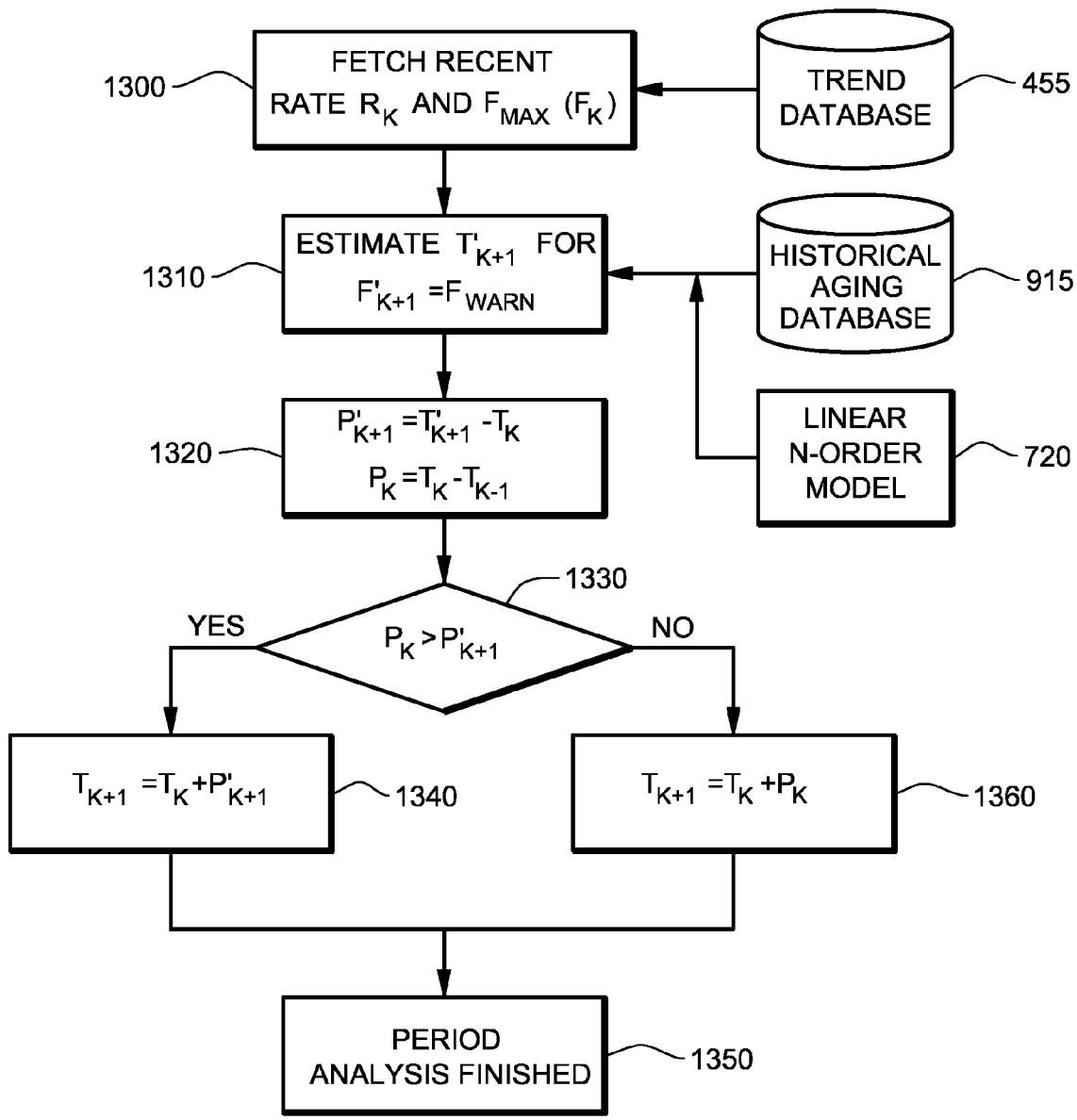
FIG. 13 is a flowchart of an alternate embodiment of logic implementing sampling period analysis for determining a sample time for next maximum frequency of operation measurement of a digital system, in accordance with an aspect of the present invention.

FIGS. 11-13 depict alternate embodiments for analyzing and dynamically adjusting the sampling period employed by the control logic in periodically determining the maximum frequency of operation of the digital system.

In FIG. 11, the most recent measured maximum frequency of operation of the digital system 1100 is, for example, fetched from the trend database 455 and compared against a first predefined threshold ($F_{TH1}$) 1110. In one embodiment, the first predefined threshold is a frequency threshold that is greater than the predefined warning threshold frequency. If the maximum frequency of operation is above the first predefined threshold, no action is necessary and sampling period analysis is complete 1130. However, if the most recently determined maximum frequency of operation is below the first predefined threshold, then the sampling period is adjusted to a new sampling period $P_1$ 1120. Sampling period analysis might then be complete (not shown), or alternatively, the most recent measured maximum frequency of operation of the digital system may be compared against a second predefined threshold ($F_{TH2}$) 1140. This second predefined threshold is a frequency that may be, in one embodiment, equal to the predefined warning threshold frequency ($F_{WARN}$). If the most recent measured maximum frequency of operation is again above the second threshold frequency, then sampling period analysis is finished 1130 and the new sampling period $P_1$ is employed. However, if the most recent measured maximum frequency of operation ($F_{MAX}(F_K)$) is also less than the second predefined threshold ($F_{TH2}$), then the sampling period employed by the control logic via periodically determining the maximum frequency of operation is set to sample a period $P_2$ 1150. This example assumes that sample period $P_2$ is less than sample period $P_1$, thereby providing a greater sampling rate for the periodically determining of the maximum frequency of operation of the digital system.

FIG. 12 depicts an alternate embodiment to the protocol of FIG. 11. In this embodiment, the rate of change in the difference between measured maximum frequencies of operation of the digital system is employed in adjusting the sample period for the periodically determining of the maximum frequency of operation. As shown, a most recent rate of change $R_K$ is, for example, retrieved 1200 from the trend database 455 and is compared to a first predefined rate of change threshold ($R_{TH1}$) 1210. If the most recent rate of change ($R_K$) is less than the first predefined rate of change threshold ($R_{TH1}$), then no action is taken and sampling period analysis is complete 1230. However, if it is less than or equal to the first threshold, then the sampling period is adjusted to sample period $P_1$ 1220, which (in one embodiment) completes adjustment of the sample period 1230. In the embodiment of FIG. 12, the most recent determined rate of change $R_K$ is further compared against a second predefined rate of change threshold ($R_{TH2}$) 1240. If the most recent rate of change $R_K$ is less than the second predefined rate of threshold change, then the sampling period remains at period $P_1$ and analysis is finished 1230. Otherwise, the sampling period is set to a second sampling period $P_2$ 1250, wherein it is assumed that sample period $P_2$ is smaller than sample period $P_1$, meaning that the sampling rate of the periodically determined maximum frequency of operation of the digital system is greater.

FIG. 13 depicts an alternate processing approach for determining a next time in which to sample the maximum frequency of operation of the digital system. In this approach, the most recently determined rate of change in the difference between measured maximum frequencies of operation, as well as the most recently measured maximum frequency of operation of the digital system, are retrieved 1300 from the trend database 455 and used to estimate a time interval ($T'_{K+1}$) for when an estimated maximum frequency of operation of the digital system ($F'_{K+1}$) will be equal to the warning threshold frequency of operation 1310. This estimate can be obtained using either historical aging information on the digital system type, for example, retrieved from a historical aging database 915, or by linear progression analysis using a linear N-order model 720. The estimated sampling time at which the estimated maximum frequency of operation of the digital system will be at the predefined warning threshold frequency is then used to determine an estimated sampling period to arrive at that predefined warning threshold frequency 1320. This estimated sampling period ($P'_{K+1}$) is compared against the previously employed sampling period $P_K$ used in measuring the most recent maximum frequency of operation of the digital system. If the previously employed sampling period is greater than the estimated sampling period to arrive at the predefined warning threshold frequency, then the sampling time employed for the next measurement of the maximum frequency of operation of the digital system is the prior sampling time plus the estimated sampling period until the maximum frequency of operation reaches the predefined warning threshold frequency 1340. Alternatively, if the previously employed sampling period is less than the estimated sampling period until the maximum frequency of operation reaches the predefined warning threshold frequency ($P'_{K+1}$), then the next sampling time is the prior sampling time plus the previously employed sampling period $P_K$ 1360. Once the sampling time for the next determination of the maximum frequency of operation of the digital system is determined, sampling period analysis is finished 1350.

Advantageously, those skilled in the art will note from the above description that provided herein are various protocols for actively monitoring or measuring aging, and hence reliability, of a specific digital system, and for issuing a warning signal if degradation of operation of the system exceeds a specified threshold. In accordance with the protocols presented, actual measurement of digital system performance is performed by evaluating a maximum frequency of operation of the digital system at periodic intervals. A variable clock frequency is employed (along with, in certain embodiments, a variable power supply) in implementing the concepts presented. Measured maximum frequencies of operation, as well as determined rates of change in the difference between measured maximum frequencies of operation of the digital system are saved (for example, in a trend database) for subsequent trend analysis and warning signal generation.

Advantageously, the sampling period for determining the maximum frequency of operation of the digital system may be changed with aging of the digital system. In generating the warning signal, either the measured maximum frequency of operation of the digital system or the estimated maximum frequency of operation of the digital system, or the actual rate of change in the difference between measured maximum frequencies of operation of the digital system may be employed in evaluating whether to issue a warning signal.

In certain embodiments, more than one warning threshold frequency and/or more than one rate of change threshold frequency may be employed, for example, in either generating different levels of warning signals, or dynamically adjusting the sampling period employed in the periodically monitoring of the maximum frequency of operation of the digital system.

Advantageously, the approach presented herein does not require burn-in testing of the digital system, and is based on measurements derived from the actual digital system itself, rather than historical data for the particular type of digital system. The protocols presented are an in situ aging prediction and warning signal generation technique. The approach may be utilized for a wide variety of digital systems, including processor based systems, as well as non-processor based systems.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 14:
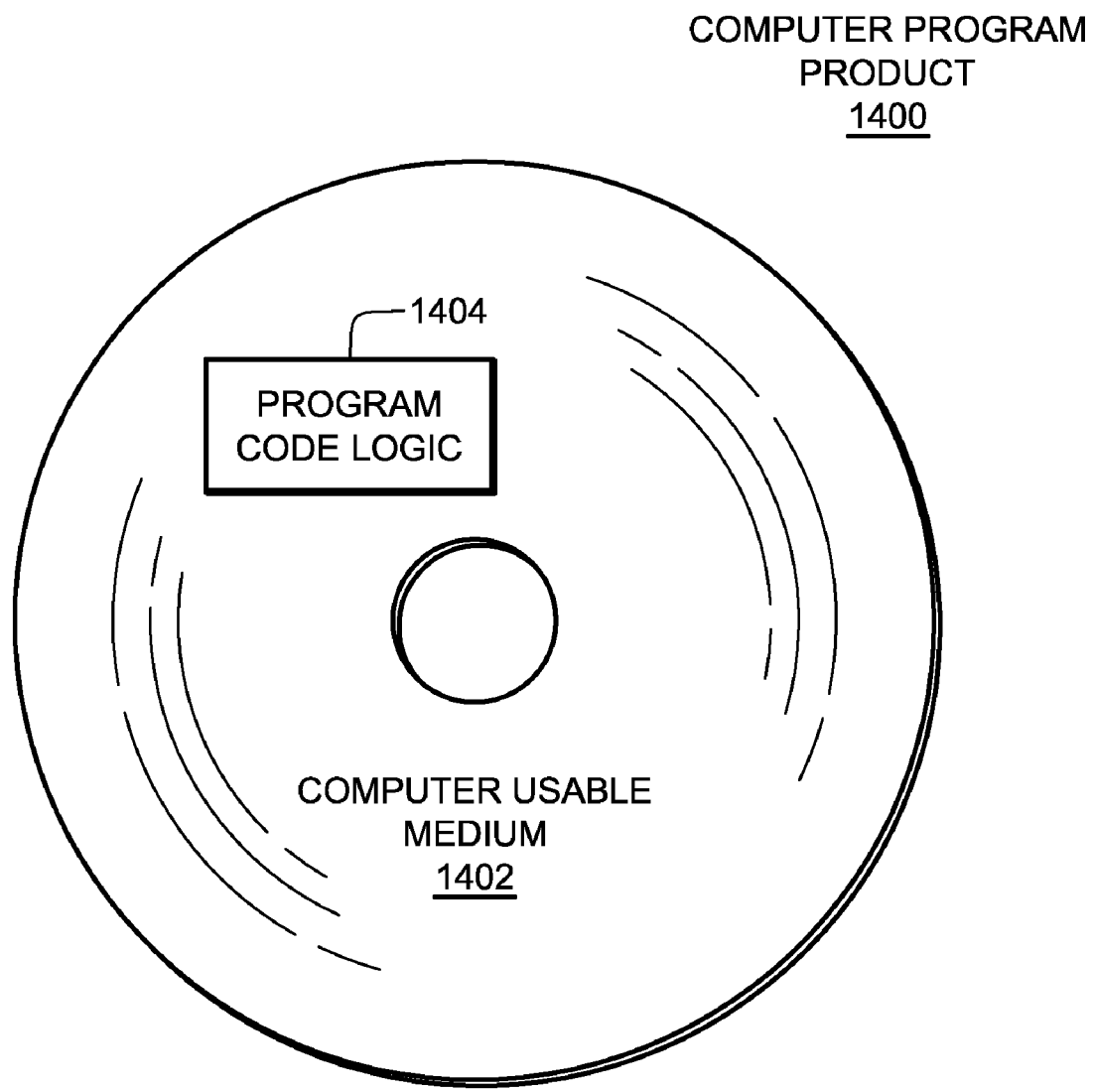
FIG. 14 depicts one embodiment of a computer program product to incorporate one or more aspects of the present invention.

One example of an article of manufacture or a computer program product incorporating one or more aspects of the present invention is described with reference to FIG. 14. A computer program product 1400 includes, for instance, one or more computer usable media 1402 to store computer readable program code means or logic 1404 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a data structure of readily accessible units of memory is provided. By employing this data structure, memory access and system performance are enhanced (e.g., faster). The data structure includes designations (e.g., addresses) of one or more units of memory (e.g., pages) that while in the data structure do not need address translation or any other test to be performed in order to access the unit of memory. This data structure can be used in any type of processing environment including emulated environments.

Although various embodiments are described above, these are only examples. For instance, one or more aspects of the present invention can be included in environments that are not emulated environments. Further, one or more aspects of the present invention can be used in emulated environments that have a native architecture that is different than the one described above and/or emulates an architecture other than the z/Architecture®. Various emulators can be used. Emulators are commercially available and offered by various companies. Additional details relating to emulation are described in *Virtual Machines: Versatile Platforms For Systems and Processes* (*The Morgan Kaufmann Series in Computer Architecture and Design*), Jim Smith and Ravi Nair, Jun. 3, 2005, which is hereby incorporated herein by reference in its entirety.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of monitoring reliability of a digital system with operational aging thereof, the method comprising:
   periodically measuring in situ, by the digital system, a current maximum frequency of operation of the digital system to monitor degradation in maximum frequency of operation of the digital system over time with operational aging thereof during end use of the digital system, the current maximum frequency of operation being determined from processing a test instruction vector, and being a highest frequency of operation of the digital system for which results from the testing pass, wherein the periodically measuring comprises:
      controlling a sampling period employed by the periodically measuring, the controlling being based on a plurality of threshold values for measured or estimated maximum frequency of operation of the digital system or rate of change in the difference between measured or estimated maximum frequencies of operation of the digital system, each threshold value having associated therewith a respective sampling period, and wherein one threshold value of the plurality of threshold values comprises a warning threshold frequency of operation; and
   generating a warning signal indicative of reliability degradation of the digital system responsive to a measured or estimated maximum frequency of operation of the digital system being below the warning threshold frequency of operation for the digital system, wherein the warning threshold frequency is greater than or equal to a manufacturer specified minimum frequency of operation for the digital system.

2. The method of claim 1, further comprising employing multiple measured maximum frequencies of operation to estimate a next maximum frequency of operation utilizing linear model estimation, and wherein the generating of the warning signal comprises generating the warning signal responsive to the estimated maximum frequency of operation of the digital system being below the warning threshold frequency of operation.

3. The method of claim 1, further comprising employing multiple measured maximum frequencies of operation of the digital system to estimate a next maximum frequency of operation of the digital system employing historical aging data for the digital system type, and wherein generating the warning signal comprises generating the warning signal if the estimated maximum frequency of operation of the digital system is below the warning threshold frequency of operation for the digital system.

4. The method of claim 1, further comprising dynamically adjusting the sampling period employed by the periodically measuring of the current maximum frequency of operation of the digital system, the dynamically adjusting comprising:
   determining whether a maximum frequency of operation of the digital system is below a first predefined threshold frequency of the plurality of threshold values, and if so, adjusting the sampling period of the periodically measuring to increase the sampling rate of the periodically determining.

5. The method of claim 4, wherein the first predefined threshold frequency is a first predefined threshold frequency which is greater than the warning threshold frequency, and wherein the dynamically adjusting of the sampling period further comprises determining whether the maximum frequency of operation of the digital system is less than or equal to the warning threshold frequency of operation, and if so, further adjusting the sampling period to further increase the sampling rate of the periodically determining of the maximum frequency of operation of the digital system.

6. The method of claim 1, further comprising dynamically adjusting the sampling period employed by the periodically measuring of the current maximum frequency of operation of the digital system, the dynamically adjusting comprising:
   determining whether a rate of change in the difference between measured maximum frequencies of operation of the digital system is above a first predefined threshold rate of change of the plurality of threshold values, and if so, adjusting the sampling period of the periodically determining to increase the sampling rate of the periodically determining.

7. The method of claim 6, wherein the dynamically adjusting of the sampling period further comprises determining whether the rate of change in the difference between measured maximum frequencies of operation of the digital system is greater than a second predefined threshold rate of change of the plurality of threshold values, and if so, further adjusting the sampling period to further increase the sampling rate of the periodically determining of the maximum frequency of operation of the digital system, wherein the second predefined threshold rate of change is greater than the first predefined threshold rate of change.

8. A method of monitoring reliability of a digital system with operational aging thereof, the method comprising:
   periodically measuring in situ, by the digital system, a current maximum frequency of operation of the digital system to monitor degradation in maximum frequency of operation of the digital system over time with operational aging thereof during end use of the digital system, the current maximum frequency of operation being determined from processing a test instruction vector, and being a highest frequency of operation of the digital system for which results from the testing pass;
   generating a warning signal indicative of reliability degradation of the digital system responsive to a measured or estimated maximum frequency of operation of the digital system being below a warning threshold frequency of operation for the digital system, wherein the warning threshold frequency is greater than or equal to a manufacturer specified minimum frequency of operation for the digital system; and
   controlling a sampling period for the periodically measuring of the maximum frequency of operation of the digital system, wherein controlling the sampling period comprises:
      estimating a time interval from a most recent determination of maximum frequency of operation of the digital system to the digital system reaching a maximum frequency of operation equal to the warning threshold frequency;
      employing the estimated time interval in setting a next sampling period for determining a maximum frequency of operation of the digital system;

determining whether the next sampling period is less than a previous sampling period employed in the periodically determining of the maximum frequency of operation of the digital system; and if so, increasing the sampling period to increase the sampling rate of the periodically measuring of the current maximum frequency of operation of the digital system.

9. A system for monitoring reliability of a digital system with operational aging thereof, the system comprising:

control logic adapted to periodically measure in situ, by the digital system, a current maximum frequency of operation of the digital system to monitor degradation in maximum frequency of operation of the digital system over time with operational aging thereof during end use of the digital system, the current maximum frequency of operation being determined from processing a test instruction vector, and being a highest frequency of operation of the digital system for which results from the testing pass, wherein the periodically measuring comprises:

controlling a sampling period employed by the periodically measuring, the controlling being based on a plurality of threshold values for measured or estimated maximum frequency of operation of the digital system or rate of change in the difference between measured or estimated maximum frequencies of operation of the digital system, each threshold value having associated therewith a respective sampling period, and wherein one threshold value of the plurality of threshold values comprises a warning threshold frequency of operation; and generate a warning signal indicative of reliability degradation of the digital system responsive to a measured or estimated maximum frequency of operation of the digital system being below a the warning threshold frequency of operation for the digital system, wherein the warning threshold frequency is greater than or equal to a manufacturer specified minimum frequency of operation for the digital system.

10. The system of claim 9, wherein the control logic is further adapted to employ multiple measured maximum frequencies of operation to estimate a next maximum frequency of operation utilizing linear model estimation, and wherein the generating of the warning signal comprises generating the warning signal responsive to the estimated maximum frequency of operation of the digital system being below the warning threshold frequency of operation.

11. The system of claim 9, wherein the control logic is further adapted to employ multiple measured maximum frequencies of operation of the digital system to estimate a next maximum frequency of operation of the digital system employing historical aging data for the digital system type, and wherein generating the warning signal comprises generating the warning signal if the estimated maximum frequency of operation of the digital system is below the warning threshold frequency of operation for the digital system.

12. The system of claim 9, wherein the control logic is further adapted to dynamically adjust the sampling period employed by the periodically measuring of the maximum frequency of operation of the digital system, the dynamically adjusting comprising:

determining whether a maximum frequency of operation of the digital system is below a first predefined threshold frequency of the plurality of threshold values, and if so, adjusting the sampling period of the periodically measuring to increase the sampling rate of the periodically determining.

13. The system of claim 12, wherein the first predefined threshold frequency is a first predefined threshold frequency which is greater than the predefined warning threshold frequency, and wherein the dynamically adjusting of the sampling period further comprises determining whether the maximum frequency of operation of the digital system is less than or equal to the predefined warning threshold frequency of operation, and if so, further adjusting the sampling period to further increase the sampling rate of the periodically determining of the maximum frequency of operation of the digital system.

14. An article of manufacture comprising:

at least one computer-readable medium having computer-readable program code logic to facilitate monitoring reliability of a digital system with operational aging thereof, the computer-readable program code logic when executing during run-time of the digital system performing:

periodically measuring in situ, by the digital system, a current maximum frequency of operation of the digital system to monitor degradation in maximum frequency of operation of the digital system over time with operational aging thereof during end use of the digital system, the current maximum frequency of operation being determined from processing a test instruction vector, and being a highest frequency of operation of the digital system for which results from the testing pass wherein the periodically measuring comprises:

controlling a sampling period employed by the periodically measuring, the controlling being based on a plurality of threshold values for measured or estimated maximum frequency of operation of the digital system or rate of change in the difference between measured or estimated maximum frequencies of operation of the digital system, each threshold value having associated therewith a respective sampling period, and wherein one threshold value of the plurality of threshold values comprises a warning threshold frequency of operation; and generating a warning signal indicative of reliability degradation of the digital system responsive to a measured or estimated maximum frequency of operation of the digital system being below the warning threshold frequency of operation for the digital system, wherein the warning threshold frequency is greater than or equal to a manufacturer specified minimum frequency of operation for the digital system.

15. A run-time method of monitoring reliability of a digital system with operational aging thereof, the method comprising:

periodically measuring in situ, by the digital system, a current maximum frequency of operation of the digital system to monitor degradation in maximum frequency of operation of the digital system over time with operational aging thereof during end use of the digital system, the current maximum frequency of operation being determined from processing a test instruction vector, and being a highest frequency of operation of the digital system for which results of the testing pass;

periodically determining a rate of change in the difference between measured maximum frequencies of operation of the digital system to determine multiple rates of change in the difference between measured maximum frequencies of operation of the digital system; and generating a warning signal indicative of reliability degradation of the digital system responsive to an estimated next maximum frequency of operation of the digital system being below a warning threshold frequency of operation of the digital system, the estimated next maximum frequency of operation of the digital system being determined based on the multiple determined rates of change in the difference between measured maximum frequencies of operation of the digital system.

16. The method of claim 15, further comprising generating a warning signal indicative of reliability degradation of the digital system responsive to a current rate of change in the difference between measured maximum frequencies of operation of the digital system exceeding the acceptable rate of change threshold for the digital system.

17. The method of claim 15, further comprising employing linear model estimation in estimating a next rate of change in the difference between maximum frequencies of operation of the digital system based on the multiple determined rates of change in the difference between measured maximum frequencies of operation of the digital system, and estimating the next maximum frequency of operation of the digital system for a next sample time based, at least in part, on the estimated next rate of change in the difference between maximum frequencies of operation of the digital system, the next sample time determined by the period of the periodically determining of the maximum frequency of operation of the digital system.

18. The method of claim 15, further comprising employing historical aging data for the digital system type to in estimating a next rate of change in the difference between maximum frequencies of operation of the digital system based on the multiple determined rates of change in the difference between measured maximum frequencies of operation of the digital system, and estimating the next maximum frequency of operation of the digital system for a next sample time based, at least in part, on the estimated next rate of change in the difference between maximum frequencies of operation of the digital system, the next sample time determined by the period of the periodically determining of the maximum frequency of operation of the digital system.

* * * * *